(12) United States Patent
Shiono et al.

(10) Patent No.: US 8,299,196 B2
(45) Date of Patent: Oct. 30, 2012

(54) ADHESIVE COMPOSITION

(75) Inventors: Mikio Shiono, Annaka (JP); Noriyuki Koike, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 63 days.

(21) Appl. No.: 13/085,510

(22) Filed: Apr. 13, 2011

(65) Prior Publication Data

US 2011/0257315 A1 Oct. 20, 2011

(30) Foreign Application Priority Data

Apr. 14, 2010 (JP) ................................ 2010-093104

(51) Int. Cl.
*C08G 77/08* (2006.01)

(52) U.S. Cl. ........................................... 528/15; 528/31

(58) Field of Classification Search ................ 528/15, 528/31
See application file for complete search history.

(56) References Cited

U.S. PATENT DOCUMENTS

| | | | |
|---|---|---|---|
| 5,656,711 A | 8/1997 | Fukuda et al. | |
| 5,665,846 A | 9/1997 | Sato et al. | |
| 5,705,586 A * | 1/1998 | Sato et al. | 528/15 |
| 6,417,311 B1 | 7/2002 | Fukuda et al. | |

FOREIGN PATENT DOCUMENTS

| | | |
|---|---|---|
| EP | 0 765 916 B1 | 11/2000 |
| EP | 1 081 185 B1 | 5/2004 |
| EP | 1 486 534 A1 | 12/2004 |
| EP | 1 571 192 A1 | 9/2005 |
| JP | 2990646 B2 | 12/1999 |
| JP | 3239717 B2 | 12/2001 |
| JP | 3567973 B2 | 9/2004 |

OTHER PUBLICATIONS

Extended European Search Report issued Sep. 12, 2011, in European Patent Appilcation No. 11003017.8.

* cited by examiner

*Primary Examiner* — Margaret Moore
(74) *Attorney, Agent, or Firm* — Birch, Stewart, Kolasch & Birch, LLP

(57) ABSTRACT

An adhesive composition is provided comprising (A) a fluorinated amide compound containing at least two vinyl groups and having a polyfluoro structure, (B) a fluorinated organosilicon compound containing a fluorinated organic group, at least two SiH groups, and an alkyl, aryl or aralkyl group, and (C) a platinum catalyst, and (D) an organosiloxane containing a SiH group and an epoxy and/or trialkoxysilyl group. The composition is cured on brief heating into a product which achieves adhesion to various substrates and has solvent resistance, chemical resistance, heat resistance, low-temperature properties, low moisture permeability, electric insulation, and acid resistance.

2 Claims, No Drawings

ADHESIVE COMPOSITION

CROSS-REFERENCE TO RELATED APPLICATION

This non-provisional application claims priority under 35 U.S.C. §119(a) on Patent Application No. 2010-093104 filed in Japan on Apr. 14, 2010, the entire contents of which are hereby incorporated by reference.

TECHNICAL FIELD

This invention relates to an adhesive composition which cures into a fluorinated elastomer to form a tenacious bond to various substrates including metals and plastics, the fluorinated elastomer having many advantages including solvent resistance, oil resistance, chemical resistance, heat resistance, low-temperature properties, low moisture permeability, electric insulation, and acid resistance.

BACKGROUND ART

Curable fluorinated elastomer compositions utilizing addition reaction between alkenyl and hydrosilyl groups are well known in the art. These compositions can be rendered self-adhesive by adding an organopolysiloxane having a hydrosilyl group and an epoxy and/or trialkoxysilyl group as the third component, as disclosed in JP 3239717 and JP 3567973. These compositions may cure on brief heating into elastomers having advantages including solvent resistance, oil resistance, chemical resistance, heat resistance, low-temperature properties, low moisture permeability, and electric insulation. They are used in the adhesive application in various industrial fields where such properties are required, and frequently for the bonding and sealing of electrical components in the automotive industry.

However, under rigorous conditions, for example, when exposed to a hot, strongly acidic atmosphere such as emissions from automotive gasoline and Diesel engines, or when contacted with or immersed in hot rancid deteriorated oils (e.g., engine oil and transmission oil), these cured elastomers shortly undergo discoloration or degradation, resulting in a substantial loss of sealing function. Even in the bonding and sealing application of electric and electronic components, there are increasing chances to encounter a rigorous environment. It would be desirable to have an adhesive composition which cures into a product having not only the above-listed properties, but also improved acid resistance.

It is noted that JP 2990646 discloses a polymer having a terminal structure [aromatic ring-Si-vinyl]. While this polymer is good in fast curing due to the inclusion of [Si-vinyl], the linkage between aromatic ring and Si is known to be acid labile. On the other hand, polymers free of [aromatic ring-Si-vinyl] at their terminus, for example, a polymer having a terminal structure [aromatic ring-alkylene-vinyl] and a polymer having a terminal structure [amide (having pendant aromatic ring substituent)-alkylene-vinyl] have good acid resistance, but are inferior in fast curing.

Citation List
Patent Document 1: JP 3239717 (U.S. Pat. No. 5,656,711, EP 0765916)
Patent Document 2: JP 3567973 (U.S. Pat. No. 6,417,311, EP 1081185)
Patent Document 3: JP 2990646

DISCLOSURE OF INVENTION

An object of the invention is to provide an adhesive composition which is cured by brief heating into a product that forms a tenacious bond to a wide variety of substrates including metals and plastics, the cured product having many advantages including solvent resistance, chemical resistance, heat resistance, low-temperature properties, low moisture permeability, electric insulation, and acid resistance.

The inventors have found that an adhesive composition comprising (A) a fluorinated amide compound containing at least two vinyl groups, each bonded to silicon atom, but not to aromatic ring, preferably at ends of the molecular chain in a molecule, and having a polyfluoro structure (specifically, divalent perfluoro structure such as perfluoroalkylene or perfluorooxyalkylene) in its backbone, (B) a fluorinated organosilicon compound containing in a molecule at least one monovalent perfluoroalkyl, monovalent perfluorooxyalkyl, divalent perfluoroalkylene or divalent perfluorooxyalkylene group and at least two silicon-bonded hydrogen atoms, and further containing a silicon-bonded monovalent substituent group which is an unsubstituted or halo-substituted alkyl, aryl or aralkyl group, and (C) a platinum group compound is improved by adding thereto (D) an organosiloxane containing in a molecule at least one silicon-bonded hydrogen atom and at least one epoxy and/or trialkoxysilyl group bonded to a silicon atom via carbon atoms or carbon and oxygen atoms. Namely, the resulting adhesive composition is cured by brief heating into a product that forms a tenacious bond to a wide variety of substrates including metals and plastics, the cured product having many advantages including solvent resistance, chemical resistance, heat resistance, low-temperature properties, low moisture permeability, electric insulation, and acid resistance.

Accordingly, the invention provides an adhesive composition comprising (A) 100 parts by weight of a fluorinated amide compound having the general formula (1):

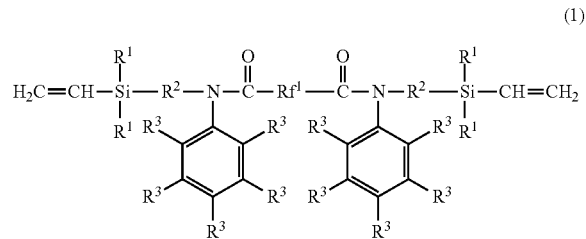

(1)

wherein $R^1$ is each independently vinyl or $C_1$-$C_4$ alkyl, $R^2$ is each independently $C_1$-$C_6$ alkylene, $R^3$ is each independently hydrogen or optionally fluorinated $C_1$-$C_4$ alkyl, and $Rf^1$ is a perfluoroalkylene or divalent perfluoropolyether group, (B) a fluorinated organosilicon compound containing in a molecule at least one monovalent perfluoroalkyl, monovalent perfluorooxyalkyl, divalent perfluoroalkylene or divalent perfluorooxyalkylene group and at least two silicon-bonded hydrogen atoms, and further containing a silicon-bonded monovalent substituent group which is selected from unsubstituted or halo-substituted $C_1$-$C_{20}$ alkyl, aryl and aralkyl groups, in an amount to give 0.5 to 3.0 moles of SiH groups per mole of vinyl in component (A), (C) a catalytic amount of a platinum group compound, and (D) 0.1 to 10 parts by weight of an organosiloxane containing in a molecule at least one silicon-bonded hydrogen atom and at least one epoxy and/or trialkoxysilyl group bonded to a silicon atom via carbon atoms or carbon and oxygen atoms.

Preferably the organosiloxane (D) further contains at least one monovalent perfluoroalkyl or monovalent perfluorooxyalkyl group bonded to a silicon atom via carbon atoms or carbon and oxygen atoms.

ADVANTAGEOUS EFFECTS OF INVENTION

The adhesive composition is cured by heating at a relatively low temperature for a short time. The cured composition forms a tenacious bond to a wide variety of substrates including metals and plastics, has many advantages including solvent resistance, chemical resistance, heat resistance, low-temperature properties, low moisture permeability, and electric insulation, and is durable against strong acids. The composition is thus useful as an adhesive applicable to various electric and electronic components which can be exposed to rigorous conditions.

DESCRIPTION OF EMBODIMENTS

In the disclosure, the singular forms "a," "an" and "the" include plural referents unless the context clearly dictates otherwise. "Optional" or "optionally" means that the subsequently described event or circumstances may or may not occur, and that description includes instances where the event or circumstance occurs and instances where it does not. As used herein, the notation (Cn-Cm) means a group containing from n to m carbon atoms per group. Me stands for methyl, and Ph for phenyl.

Component A

Component (A) is a linear polyfluoroamide compound containing at least two vinyl groups in a molecule, represented by the general formula (1) below. This polyfluoroamide compound is characterized by a terminal structure having a silicon-bonded vinyl group [Si-vinyl], but free of a linkage between aromatic ring and silicon atom [aromatic ring-Si].

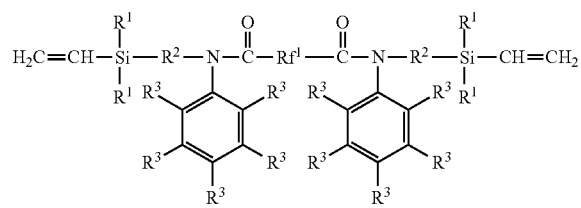
(1)

Herein $R^1$ is each independently vinyl or $C_1$-$C_4$ alkyl, $R^2$ is each independently $C_1$-$C_6$ alkylene, $R^3$ is each independently hydrogen or optionally fluorinated $C_1$-$C_4$ alkyl, and $Rf^1$ is a perfluoroalkylene or divalent perfluoropolyether group.

In formula (1), $R^1$ is vinyl or $C_1$-$C_4$ alkyl, and specifically, vinyl, methyl, ethyl, propyl or butyl. $R^2$ is $C_1$-$C_6$ alkylene, preferably $C_3$-$C_6$ alkylene, and specifically, methylene, ethylene, propylene (also referred to as trimethylene or methylethylene), butylene (also referred to as tetramethylene or methylpropylene), or hexamethylene. $R^3$ is hydrogen or optionally fluorinated $C_1$-$C_4$ alkyl. Examples of the optionally fluorinated $C_1$-$C_4$ alkyl include alkyl groups such as methyl, ethyl, propyl, and butyl and fluorinated forms of the foregoing in which some or all hydrogen atoms are substituted by fluorine, such as trifluoromethyl. Preferably, $R^1$ is methyl or vinyl, and $R^2$ is ethylene or trimethylene.

$Rf^1$ is a perfluoroalkylene group or a divalent perfluoropolyether group. Suitable perfluoroalkylene groups include straight or branched perfluoroalkylene groups of 2 to 10 carbon atoms, preferably 2 to 6 carbon atoms.

Suitable divalent perfluoropolyether groups include those groups containing a multiplicity of repeat units:

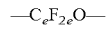

wherein e is an integer of 1 to 6. Exemplary groups are represented by the general formula (2):

     (2)

wherein e is as defined above and f is an integer of 20 to 600, preferably 30 to 400, and more preferably 30 to 200.

Examples of repeat units of the formula: —$C_eF_{2e}$O— include —$CF_2$O—, —$CF_2CF_2$O—, —$CF_2CF_2CF_2$O—, —$CF(CF_3)CF_2$O—, —$CF_2CF_2CF_2CF_2$O—, —$CF_2CF_2CF_2CF_2CF_2CF_2$O—, and —$C(CF_3)_2$O—. Inter alia, —$CF_2$O—, —$CF_2CF_2$O—, —$CF_2CF_2CF_2$O—, and —$CF(CF_3)CF_2$O— are preferred. It is noted that the perfluoropolyether structure may be composed of repeat units of one type or repeat units of more than one type.

Exemplary perfluoropolyether structures are illustrated below.

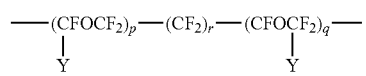

Herein Y is F or $CF_3$, p, q and r each are an integer in the range: $p \geq 0$, $q \geq 0$, $0 \leq p+q \leq 200$, specifically $2 \leq p+q \leq 150$, and $0 \leq r \leq 6$.

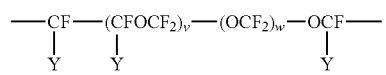

Herein Y is F or $CF_3$, v and w each are an integer in the range: $1 \leq v \leq 20$ and $1 \leq w \leq 20$.

Herein z is an integer in the range: $1 \leq z \leq 100$.

Examples of the group $Rf^1$ are given below.

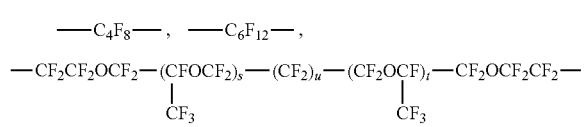

Herein s, t and u each are an integer in the range: $s \geq 0$, $t \geq 0$, $0 \leq s+t \leq 200$, specifically $2 \leq s+t \leq 150$, and $0 \leq u \leq 6$.

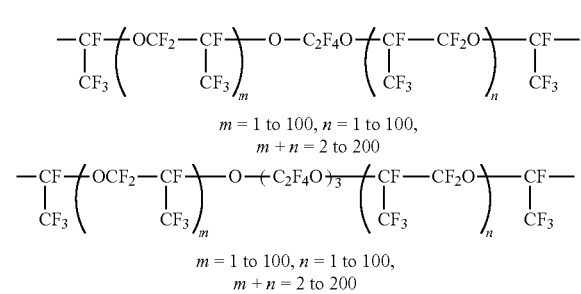

$m = 1$ to 100, $n = 1$ to 100,
$m + n = 2$ to 200

$m = 1$ to 100, $n = 1$ to 100,
$m + n = 2$ to 200

-continued
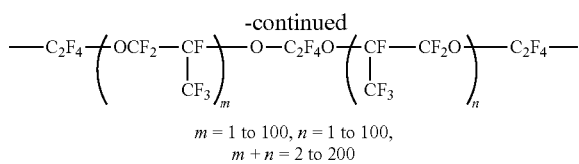
$m = 1$ to $100$, $n = 1$ to $100$,
$m + n = 2$ to $200$
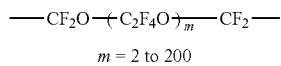
$m = 2$ to $200$
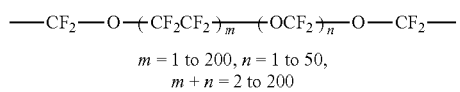
$m = 1$ to $200$, $n = 1$ to $50$,
$m + n = 2$ to $200$
-continued
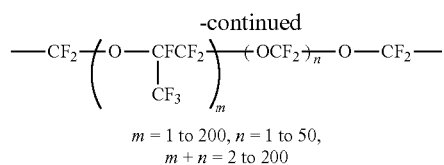
$m = 1$ to $200$, $n = 1$ to $50$,
$m + n = 2$ to $200$
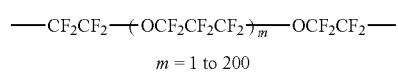
$m = 1$ to $200$
Note that m and n each are an integer in the indicated range.
Examples of the fluorinated amide compound having formula (1) are given below, but not limited thereto.
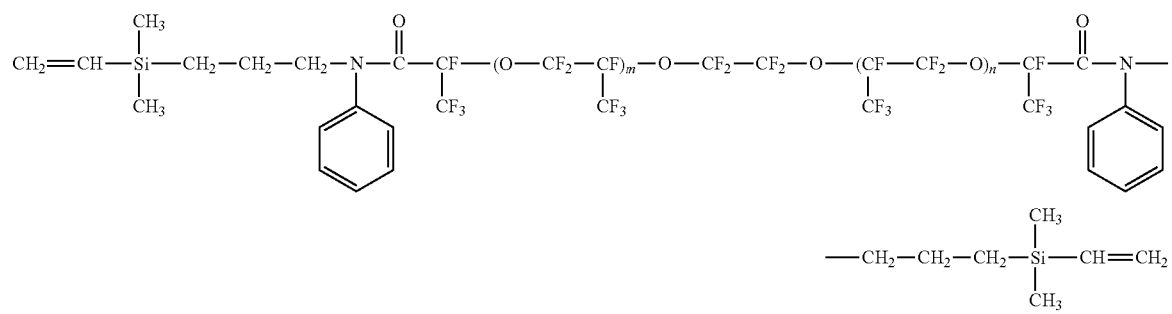
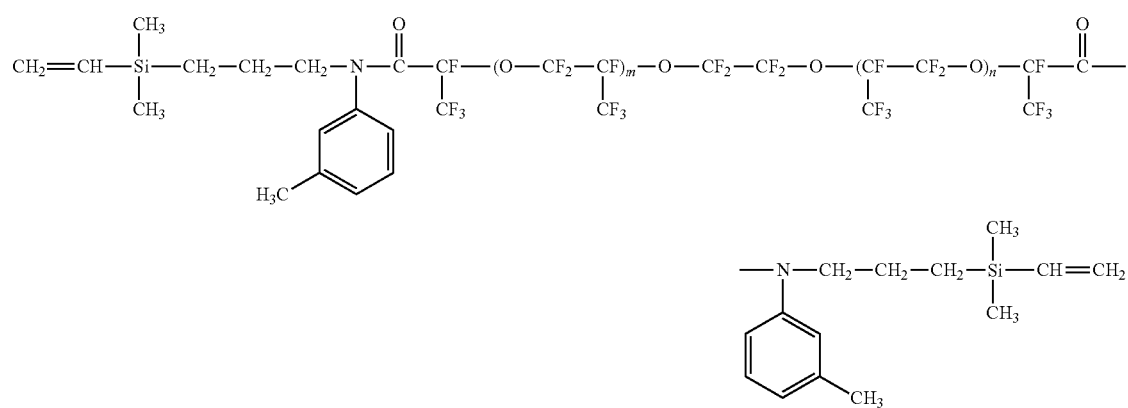
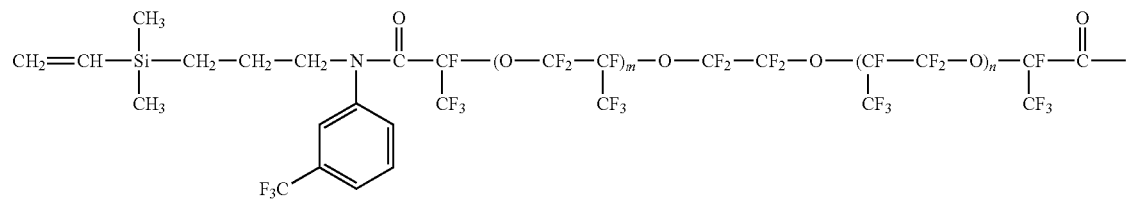
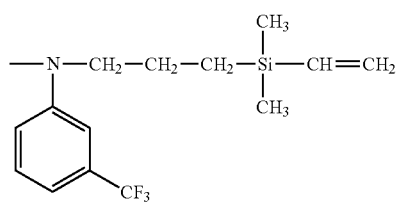

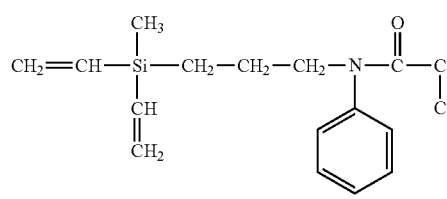
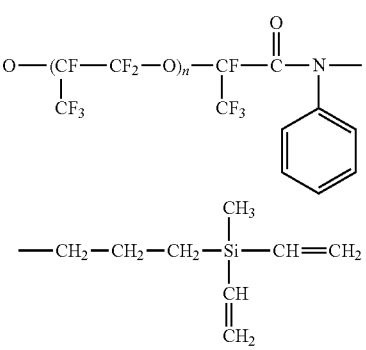

Herein m is an integer of 1 to 100, n is an integer of 1 to 100, and m+n ranges from 2 to 200.

Preferably the fluorinated amide compound having formula (1) has a viscosity at 23° C. of 100 to 100,000 mPa-s, more preferably 500 to 50,000 mPa-s, and even more preferably 1,000 to 20,000 mPa-s. A composition comprising a fluorinated amide compound having a viscosity within the range is effectively curable and has adequate physical properties, which make the composition suitable for the intended use in sealing, potting, coating, impregnation or the like. Depending on a particular application, an optimum viscosity may be selected in the range. It is noted that the viscosity is measured by a Brookfield rotational viscometer.

Component B

Component (B) is a fluorinated organosilicon compound containing per molecule at least one, preferably 1 to 10, mono- or divalent fluorinated organic group and at least two, specifically 2 to 200, preferably 2 to 50, silicon-bonded hydrogen atoms (i.e., SiH or hydrosilyl groups), and having a siloxane and/or silalkylene structure in the molecule. Component (B) functions as a crosslinker and chain extender for component (A). From the standpoints of compatibility with and dispersion in component (A) and uniformity after curing, the fluorinated organosilicon compound should have per molecule at least one mono- or divalent fluorinated organic group, specifically monovalent perfluoroalkyl, monovalent perfluorooxyalkyl (or perfluoropolyether), divalent perfluoroalkylene or divalent perfluorooxyalkylene (or perfluoropolyether) group.

Suitable mono- or divalent fluorinated organic groups include groups of the following general formulae:

$C_gF_{2g+1}-$ wherein g is an integer of 1 to 20, preferably 2 to 10, $F-[CF(CF_3)CF_2O]_h-C_iF_{2i}-$ wherein h is an integer of 1 to 200, preferably 2 to 100, and i is an integer of 1 to 3, $-C_gF_{2g}-$ wherein g is an integer of 1 to 20, preferably 2 to 10,

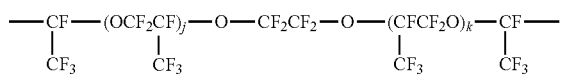

wherein j and k each are an integer of at least 1, j+k is on average from 2 to 200, preferably 2 to 100, and $-CF_2O-(CF_2CF_2O)_x-(CF_2O)_y-CF_2-$ wherein x is an integer of 1 to 200, and y is an integer of 1 to 50.

The perfluoroalkyl, perfluorooxyalkyl, perfluoroalkylene or perfluorooxyalkylene group is preferably linked to a silicon atom by a divalent linking group. The divalent linking group is an alkylene group, arylene group, a combination thereof, or such a group which is separated by an ethereal oxygen atom, amide bond, carbonyl bond, silylene or ester bond. The preferred linking groups are of 2 to 12 carbon atoms, with examples being shown below wherein Ph denotes phenyl or phenylene.

$-CH_2CH_2-$ $-CH_2CH_2CH_2-$ $-CH_2CH_2CH_2OCH_2-$ $-CH_2CH_2CH_2-NH-CO-$ $-CH_2CH_2CH_2-N(Ph)\text{-}CO-$ $-CH_2CH_2CH_2-N(CH_3)-CO-$ $-CH_2CH_2CH_2-N(CH_2CH_3)-CO-$ $-CH_2CH_2-Si(CH_3)_2-CH_2CH_2CH_2-N(Ph)\text{-}CO-$ $-CH_2CH_2-Si(CH_3)_2\text{-}Ph\text{-}N(CH_3)-CO-$ $-CH_2CH_2-Si(CH_3)_2\text{-}Ph\text{-}N(C_2H_5)-CO-$ $-CH_2CH_2CH_2-Si(CH_3)_2\text{-}Ph\text{-}N(CH_3)-CO-$ $-CH_2CH_2CH_2-O-CO-$ In addition to the mono- or divalent fluorinated organic group and silicon-bonded hydrogen atoms, the organosilicon compound as component (B) contains a silicon-bonded monovalent substituent group, which is selected from unsubstituted or halo-substituted alkyl, aryl and aralkyl groups of 1 to 20 carbon atoms, preferably 1 to 12 carbon atoms. Suitable $C_1$-$C_{20}$ hydrocarbon groups include alkyl groups such as methyl, ethyl, propyl, butyl, hexyl, cyclohexyl, and octyl; aryl groups such as phenyl and tolyl; aralkyl groups such as benzyl, phenylethyl and phenylpropyl; and halogenated forms of the foregoing in which some or all hydrogen atoms are substituted by halogen atoms such as fluorine.

The organosilicon compound as component (B) may have a linear, branched or cyclic structure. The number of silicon atoms per molecule is generally about 2 to 60, preferably about 3 to 30, though not limited thereto.

The organosilicon compounds containing a mono- or divalent fluorinated organic group and silicon-bonded hydrogen atoms include, for example, organosilicon compounds of siloxane and/or silalkylene structure as shown below. These compounds may be used alone or in admixture of two or more.

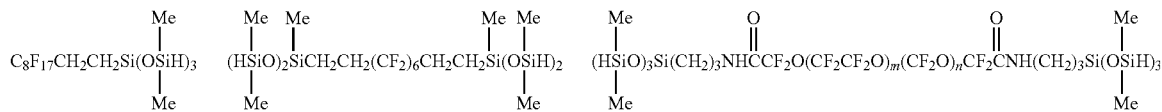
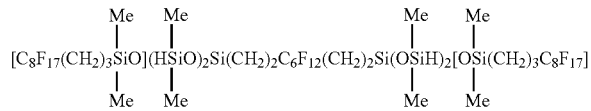
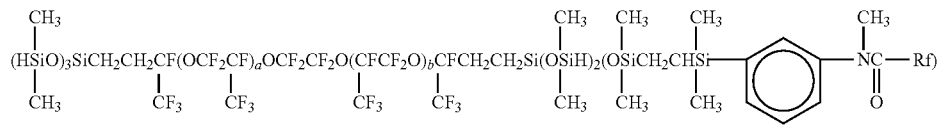
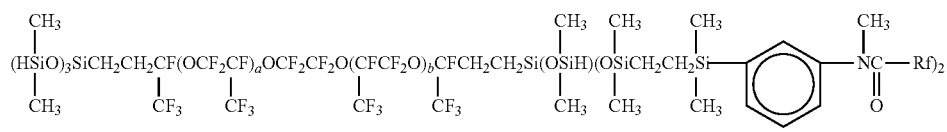
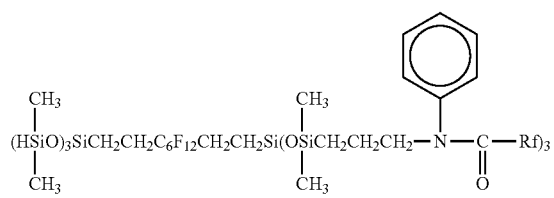
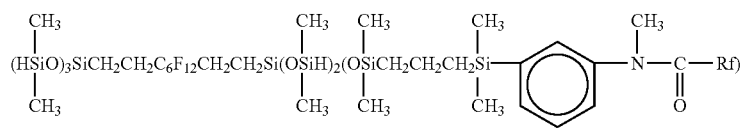
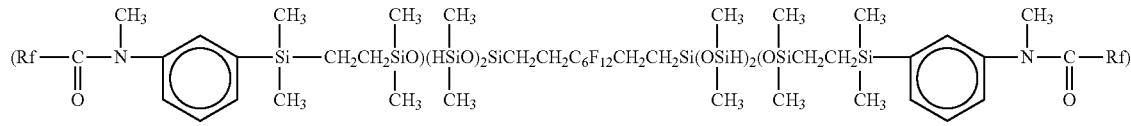
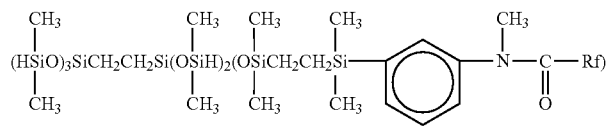
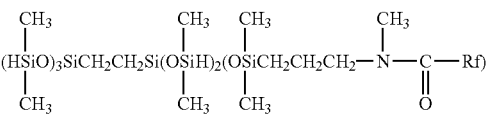

-continued
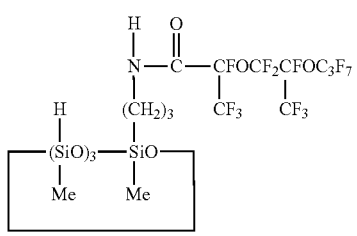
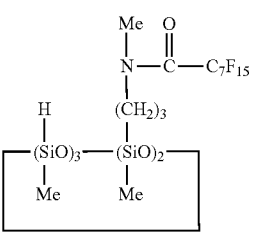
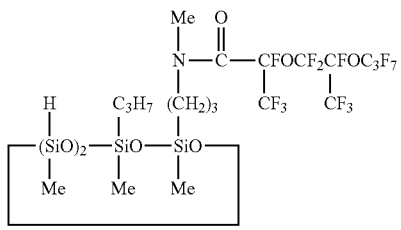
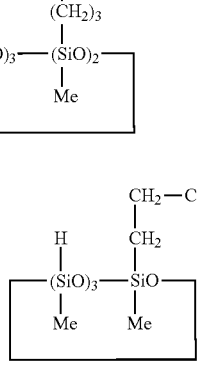
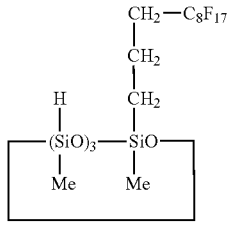
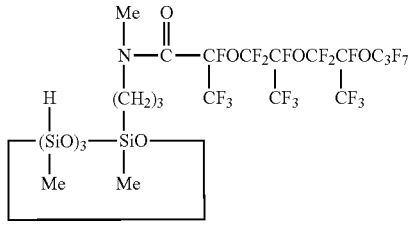
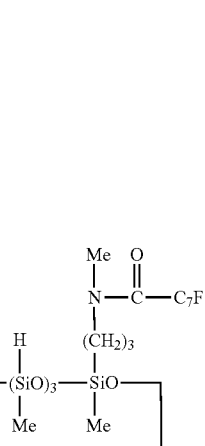
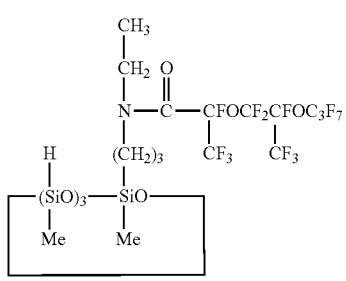
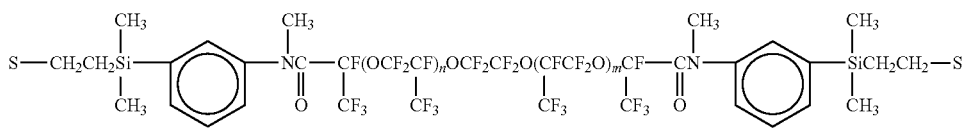
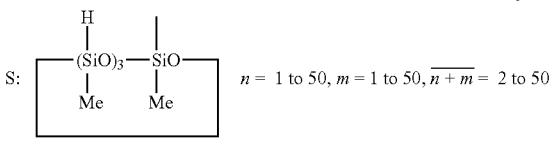
$n = 1$ to $50$, $m = 1$ to $50$, $\overline{n+m} = 2$ to $50$
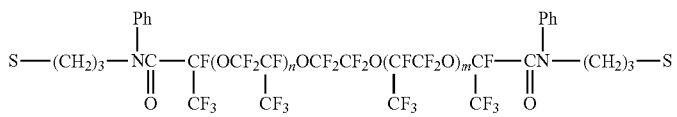
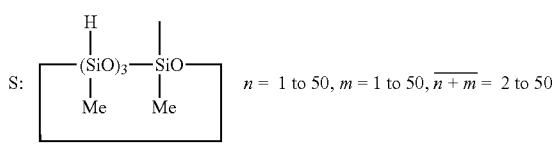
$n = 1$ to $50$, $m = 1$ to $50$, $\overline{n+m} = 2$ to $50$ -continued
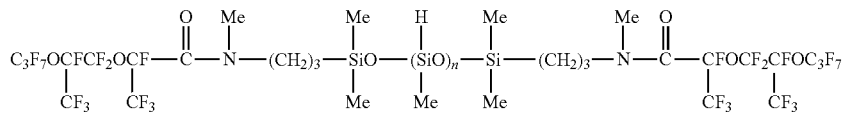
$\overline{n}$ = 3 to 50
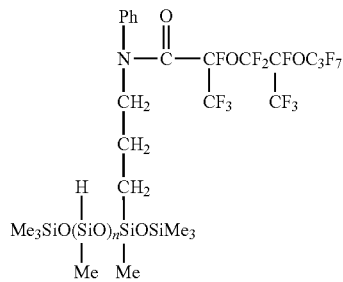
$\overline{n}$ = 3 to 50
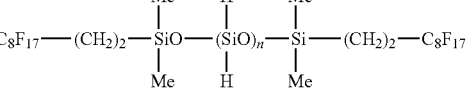
$\overline{n}$ = 3 to 50
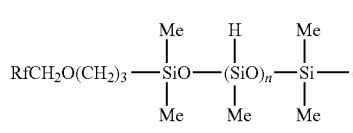
$\overline{n}$ = 3 to 50
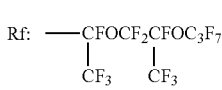
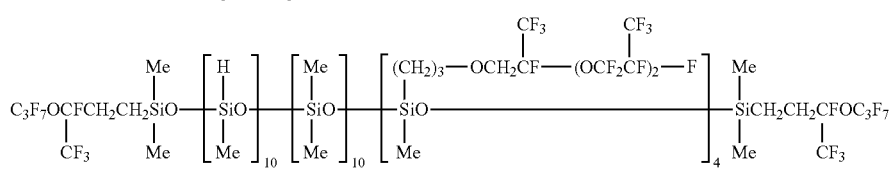
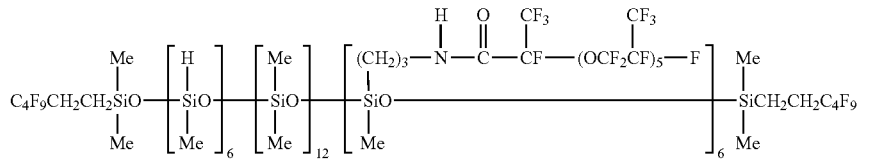
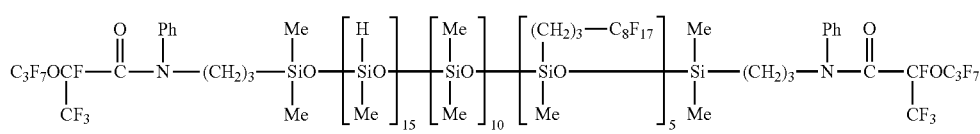
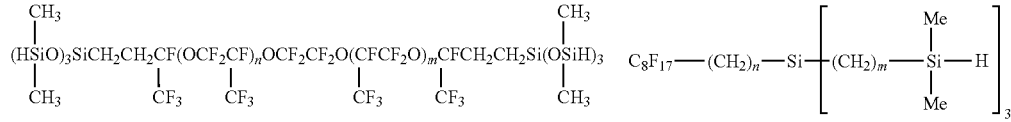
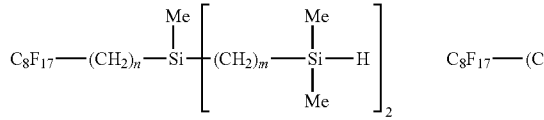
$\overline{n+m}$ = 2 to 50
$n$ = 1 to 50, $m$ = 1 to 50
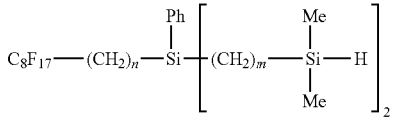
$m$ = 1 to 3, $n$ = 1 to 8
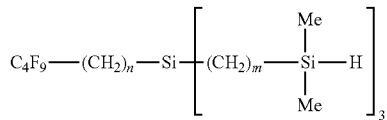
$m$ = 1 to 3, $n$ = 1 to 8
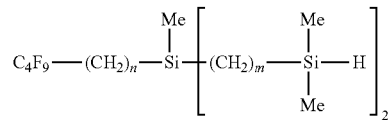
$m$ = 1 to 3, $n$ = 1 to 8
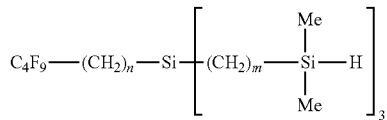
$m$ = 1 to 3, $n$ = 1 to 8
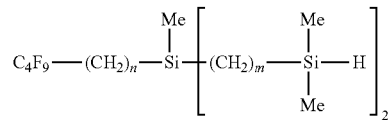
$m$ = 1 to 3, $n$ = 1 to 8

-continued
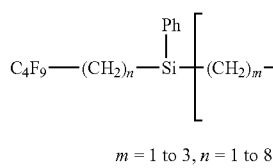
m = 1 to 3, n = 1 to 8
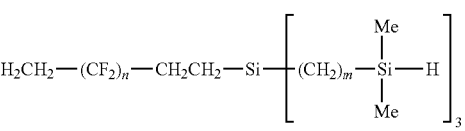
m = 1 to 4, n = 1 to 8
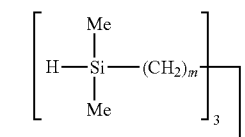
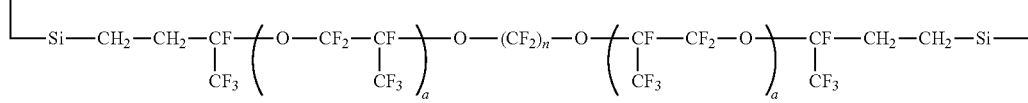
a = 1 to 200, b = 1 to 200, n = 2 to 10, m = 1 to 4
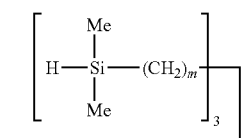
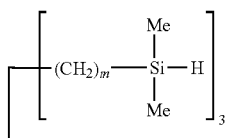
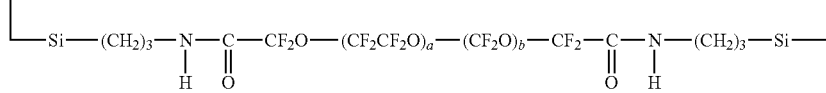
a = 1 to 200, b = 1 to 200, m = 1 to 4
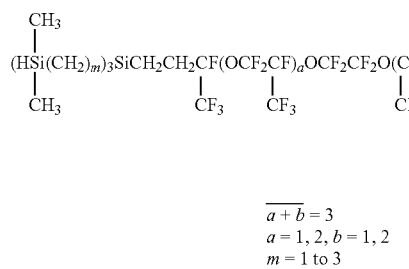
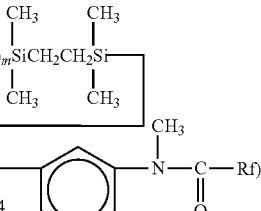
$\overline{a+b} = 3$
$a = 1, 2, b = 1, 2$
$m = 1$ to 3
Rf: 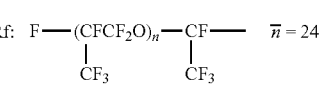 $\overline{n} = 24$
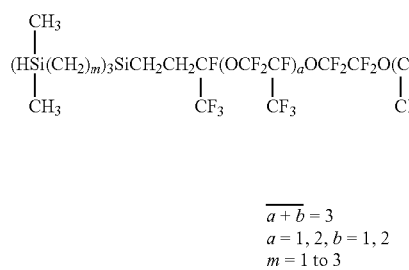
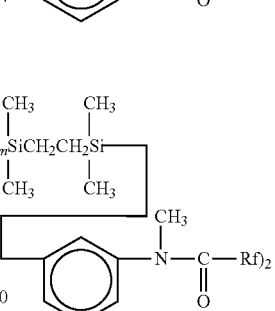
$\overline{a+b} = 3$
$a = 1, 2, b = 1, 2$
$m = 1$ to 3
Rf: 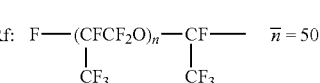 $\overline{n} = 50$
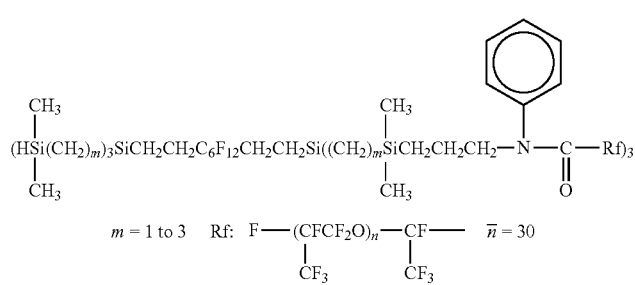
m = 1 to 3    Rf: F—(CFCF$_2$O)$_n$—CF—   $\overline{n} = 30$
                        |            |
                        CF$_3$       CF$_3$ -continued

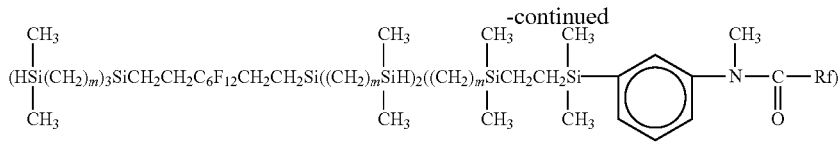

m = 1 to 3    Rf: F—(CFCF$_2$O)$_n$—CF—   $\bar{n}$ = 24
                              |        |
                              CF$_3$    CF$_3$

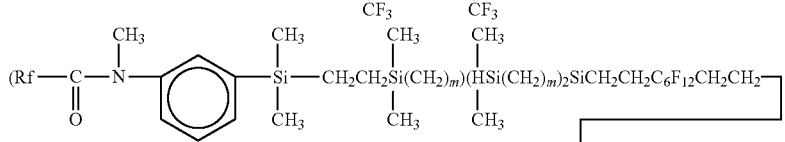

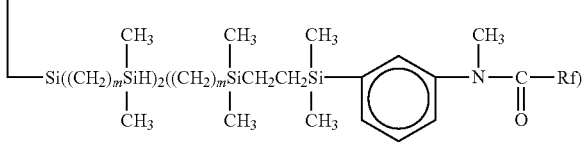

m = 1 to 3    Rf: F—(CFCF$_2$O)$_n$—CF—   $\bar{n}$ = 24
                              |        |
                              CF$_3$    CF$_3$

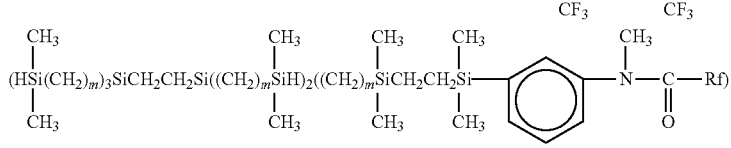

m = 1 to 3    Rf: F—(CFCF$_2$O)$_n$—CF—   $\bar{n}$ = 35
                              |        |
                              CF$_3$    CF$_3$

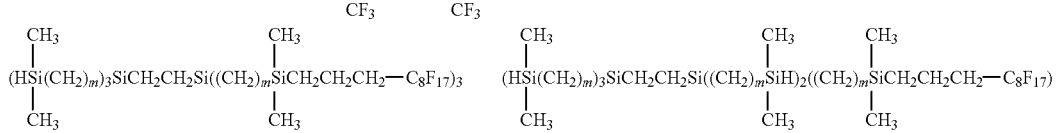

m = 1 to 3                                       m = 1 to 3

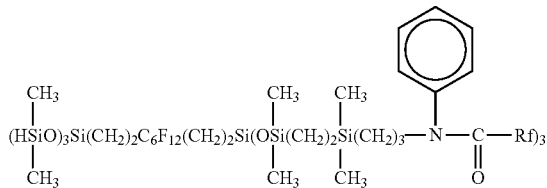

Rf: F—(CFCF$_2$O)$_n$—CF—   $\bar{n}$ = 24
                |        |
                CF$_3$    CF$_3$ Component (B) is used in an amount to give 0.5 to 3 moles, preferably 0.8 to 2 moles of hydrosilyl (SiH) groups per mole of vinyl in component (A). With fewer SiH groups available, the result may be an insufficient degree of crosslinking or cure failure. Too much SiH groups may cause foaming during the cure step.

In the practice of the invention, components (A), (B) and (D) are preferably combined such that 0.55 to 3.2 moles, more preferably 0.85 to 2.2 moles of SiH groups available from components (B) and (D) are present per mole of vinyl available from component (A).

Component C

Component (C) is a platinum group compound which is a catalyst for promoting addition reaction between vinyl groups in component (A) and hydrosilyl groups in component (B). As the platinum group compound or platinum group metal catalyst, platinum compounds are often used because they are relatively readily available. Suitable platinum compounds include chloroplatinic acid, complexes of chloroplatinic acid with olefins such as ethylene, complexes of chloroplatinic acid with alcohols and vinylsiloxanes, and metallic platinum on silica, alumina and carbon carriers. Suitable platinum group metal catalysts other than the platinum compounds include rhodium, ruthenium, iridium and palladium compounds, such as, for example, RhCl(PPh$_3$)$_3$, RhCl(CO)(PPh$_3$)$_3$, Ru$_3$(CO)$_{12}$, IrCl(CO)(PPh$_2$)$_2$, and Pd(PPh$_3$)$_4$.

These catalysts, which are often solid, may be used in the solid form. However, a solution of chloroplatinic acid or complex thereof in a suitable solvent is preferably used because the solution is compatible with the fluorinated amide compound (A) so that a cured product becomes more uniform.

Component (C) may be used in a catalytic amount. Usually, the catalyst is used in such an amount as to give 0.1 to 500 ppm of platinum group metal based on the total weight of components (A) and (B).

Component D

Component (D) is an organosiloxane which is compounded for helping the composition develop self-adhesion.

The organosiloxane has in the molecule at least one silicon-bonded hydrogen atom (SiH group) and at least one epoxy group and/or trialkoxysilyl group bonded to a silicon atom via carbon atoms or carbon and oxygen atoms, and preferably further has at least one perfluoroalkyl or perfluorooxyalkyl group bonded to a silicon atom via carbon atoms or carbon and oxygen atoms.

The organosiloxane (D) has a siloxane structure which may be cyclic, chain-like or branched or a mixture thereof. Suitable examples of the organosiloxane (D) are shown below.

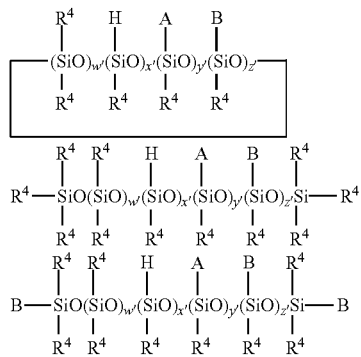

Herein $R^4$ is a substituted or unsubstituted monovalent hydrocarbon group, A is an epoxy group or trialkoxysilyl group bonded to a silicon atom via carbon atoms or carbon and oxygen atoms, B is a perfluoroalkyl or perfluorooxyalkyl group bonded to a silicon atom via carbon atoms or carbon and oxygen atoms, w' is an integer of 0 to 100, x' is an integer of 1 to 100, y' is an integer of 1 to 100, and z' is an integer of 0 to 100.

Suitable substituted or unsubstituted monovalent hydrocarbon groups represented by $R^4$ are of 1 to 10 carbon atoms, preferably 1 to 8 carbon atoms, and include alkyl groups such as methyl, ethyl, propyl, butyl, hexyl, cyclohexyl and octyl; aryl groups such as phenyl and tolyl; aralkyl groups such as benzyl and phenylethyl; and substituted forms of the foregoing groups in which some or all hydrogen atoms are substituted by halogen atoms such as fluorine. Inter alia, methyl is most preferred.

It is preferred that w' be an integer of 0 to 20, x' be an integer of 1 to 20, y' be an integer of 1 to 20, z' be an integer of 1 to 20, and w'+x'+y'+z' be an integer of 3 to 50.

A is an epoxy group or trialkoxysilyl group bonded to a silicon atom via carbon atoms or carbon and oxygen atoms, which is exemplified by groups of the following formulae.

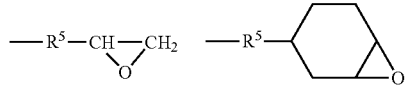

Herein $R^5$ is a divalent hydrocarbon group of 1 to 10 carbon atoms, more specifically 1 to 5 carbon atoms, which may be separated by an oxygen atom. Exemplary are alkylene groups such as methylene, ethylene and propylene, cycloalkylene groups such as cyclohexylene, and oxyalkylene groups such as oxyethylene, oxypropylene and oxybutylene.

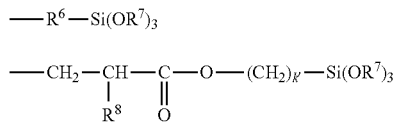

Herein $R^6$ is a divalent hydrocarbon group of 1 to 10 carbon atoms, more specifically 1 to 4 carbon atoms, for example, alkylene such as methylene, ethylene or propylene. $R^7$ is a monovalent hydrocarbon group of 1 to 8 carbon atoms, more specifically 1 to 4 carbon atoms, for example, alkyl such as methyl, ethyl, propyl or butyl. $R^8$ is hydrogen or methyl. The subscript k' is an integer of 2 to 10, preferably 3 to 8.

Examples of the group represented by A are given below.

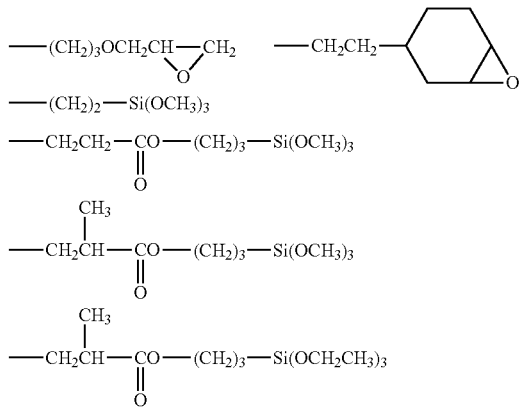

B is a monovalent perfluoroalkyl or perfluorooxyalkyl group bonded to a silicon atom via carbon atoms or carbon and oxygen atoms. Exemplary monovalent perfluoroalkyl or perfluorooxyalkyl groups include those of the following general formulae.

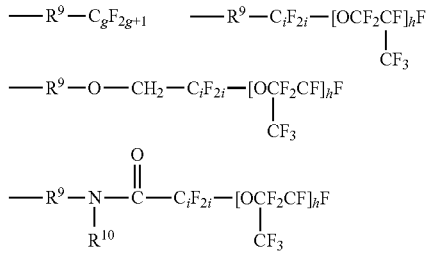

Herein $R^9$ is a divalent hydrocarbon group of 1 to 10 carbon atoms, more specifically 1 to 4 carbon atoms, for example, alkylene such as methylene, ethylene or propylene; $R^{10}$ is hydrogen, methyl or phenyl; g is an integer of 1 to 20, preferably 2 to 10, h is an integer of 1 to 200, preferably 1 to 100, and i is an integer of 1 to 3.

Examples of the group represented by B are given below.

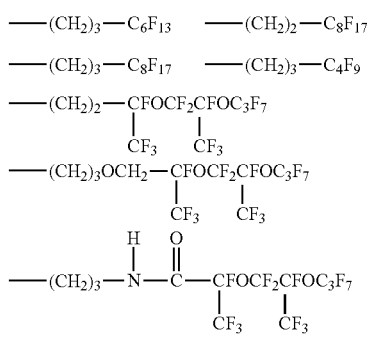

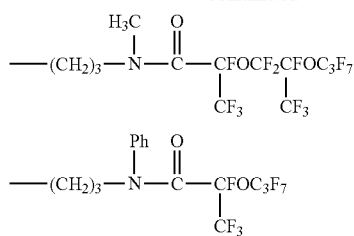

The organosiloxane as component (D) may be obtained by combining an organohydrogenpolysiloxane having at least two, preferably at least three silicon-bonded hydrogen atoms (SiH groups) in the molecule with a compound having an aliphatic unsaturated group (e.g., vinyl or allyl) and an epoxy or trialkoxysilyl group and optionally, a compound having an aliphatic unsaturated group and a perfluoroalkyl or perfluorooxyalkyl group and effecting partial addition reaction therebetween in accordance with a standard procedure. The amounts of the reactants combined should be such that the number of aliphatic unsaturated groups be smaller than the number of SiH groups because the resultant organosiloxane should have at least one SiH group.

In the preparation of the organosiloxane, the end compound may be isolated from the reaction mixture at the end of reaction although the reaction mixture may be used as long as the unreacted reactants and addition reaction catalyst have been removed therefrom.

Suitable organosiloxanes which can serve as component (D) include those of the following structural formulae, which may be used alone or in admixture.

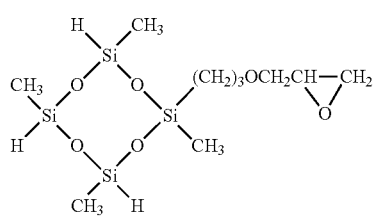

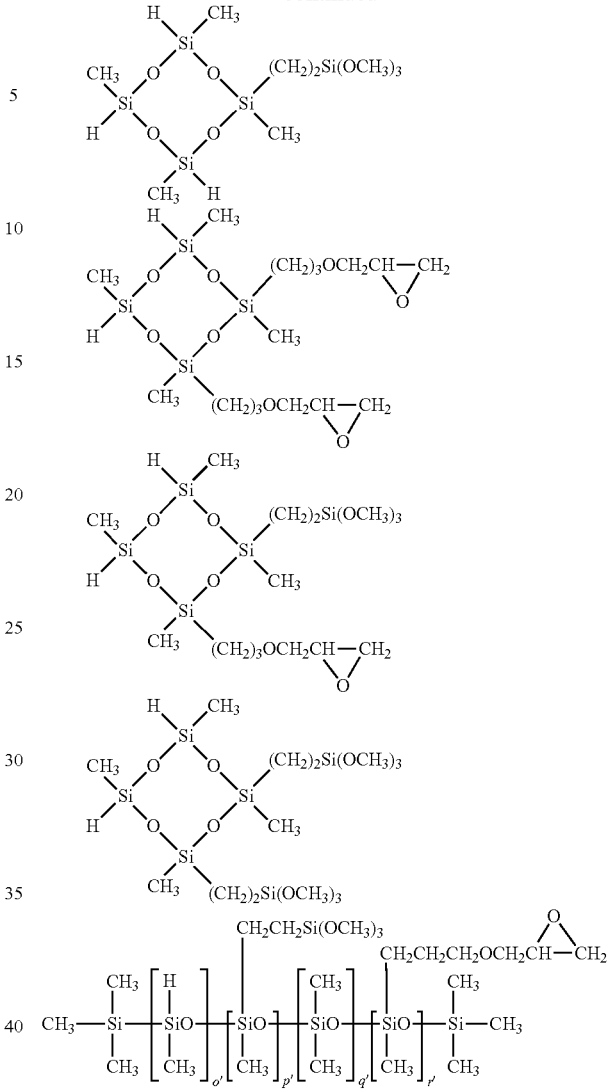

The subscripts o', q', and r' are positive integers, and p' is an integer inclusive of 0.

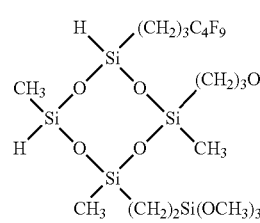
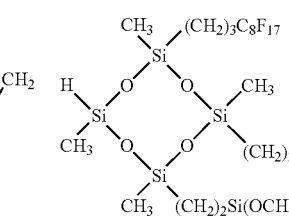
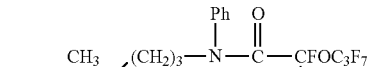

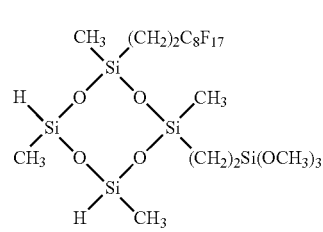
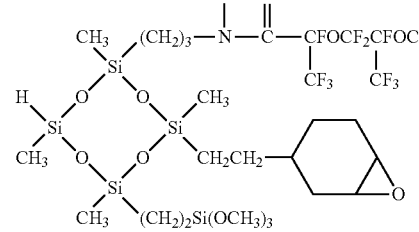
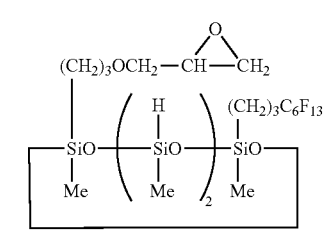

-continued
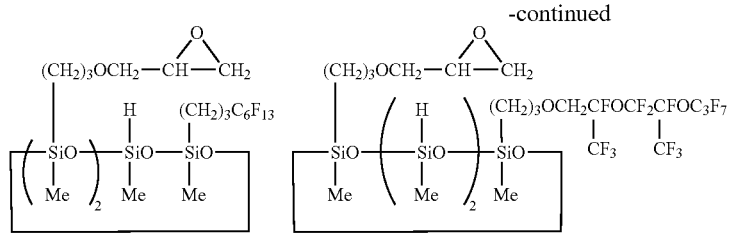
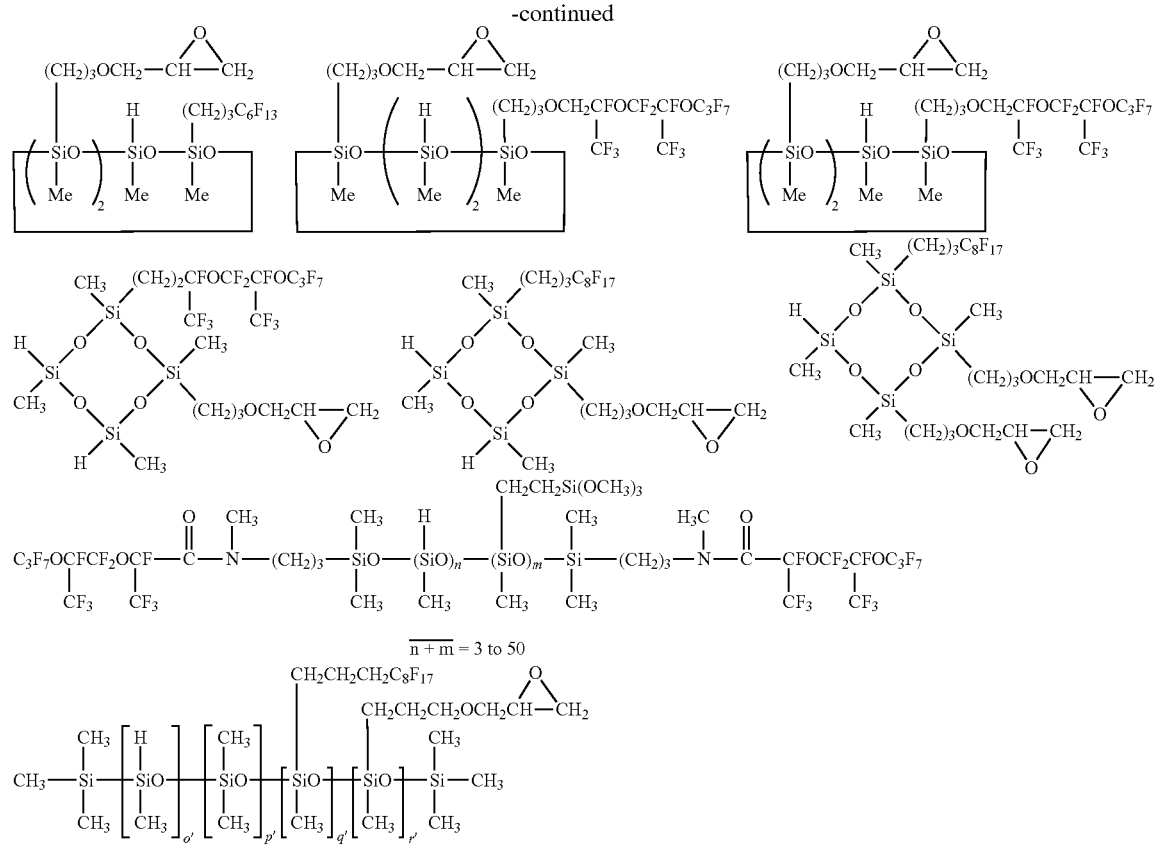
The subscripts o', q', and r' are positive integers, and p' is an integer inclusive of 0.
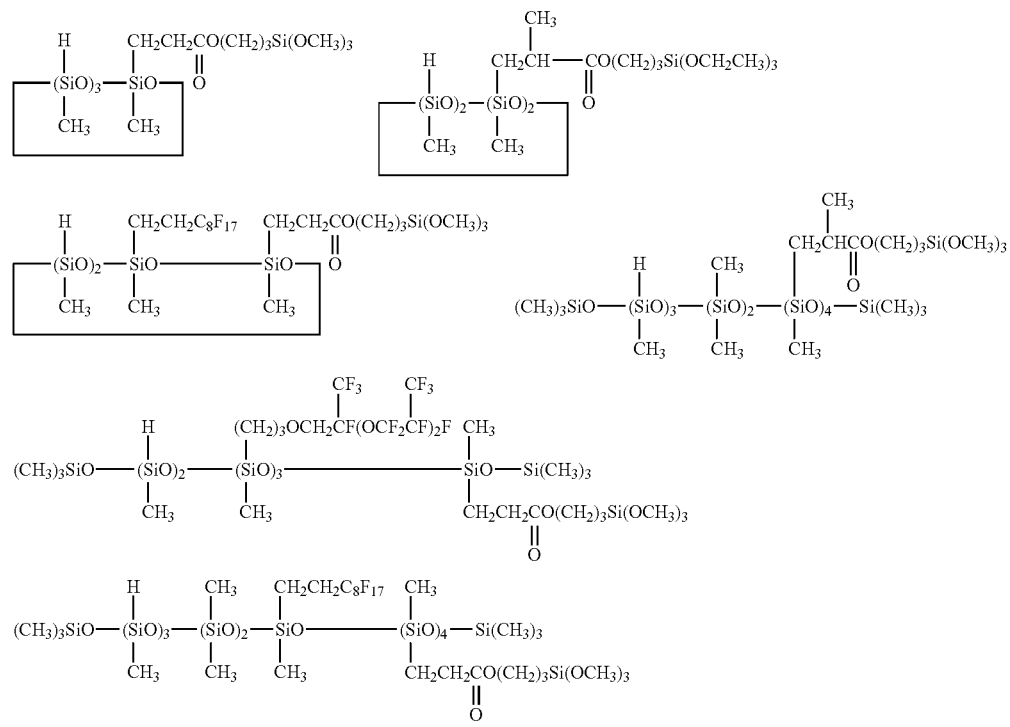

Component (D) is used in an amount of 0.1 to 10 parts, and preferably 0.2 to 5 parts by weight per 100 parts by weight of component (A). Less than 0.1 phr of component (D) may fail to achieve satisfactory adhesion whereas more than 10 phr may interfere with the flow, often interfere with the cure of the composition, and have a negative impact on the physical strength of the cured composition.

Other Components

In addition to the aforementioned components (A) to (D), various additives such as a plasticizer, viscosity modifier, flexibilizer, hydrosilylation catalyst inhibitor, inorganic filler, tackifier, adhesion auxiliary (other than D), and silane coupling agent may be added to the composition for enhancing its commercial utility. Such additives are compounded in any desired amounts as long as they do not compromise the objects of the invention or adversely affect the properties of the composition and the physical properties of the cured composition.

As the plasticizer, viscosity modifier or flexibilizer, a polyfluoromonoalkenyl compound having the general formula (2) and/or linear polyfluoro compounds having the general formulae (3) and (4) may be used.

$$Rf^2—(X')_a—CH=CH_2 \quad (2)$$

Herein $Rf^2$ is a group of the general formula (i):

$$F—[CF(CF_3)CF_2O]_{h'}—C_{i'}F_{2i'}— \quad (i)$$

wherein h' is an integer of 1 to 200, preferably 1 to 150, and i' is an integer of 1 to 3. X' is —CH$_2$—, —OCH$_2$—, —CH$_2$OCH$_2$— or —CO—NR'—Y'— wherein R' is hydrogen, methyl, phenyl or allyl and Y' is —CH$_2$—, a o, m or p-dimethylsilylphenylene group of the following structural formula (Z') or a group of the following structural formula (Z").

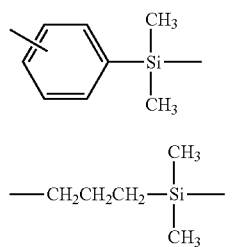

The subscript "a" is 0 or 1.

$$D\text{-}O—(CF_2CF_2CF_2O)_b\text{-}D \quad (3)$$

Herein D is a group: $C_gF_{2g'+1}$— wherein g' is 1 to 3, and b is an integer of 1 to 200.

$$D\text{-}O—(CF_2O)_c—(CF_2CF_2O)_d\text{-}D \quad (4)$$

Herein D is as defined above, c and d each are an integer of 1 to 200 and c+d is 2 to 200.

Examples of the polyfluoromonoalkenyl compound of formula (2) are given below.

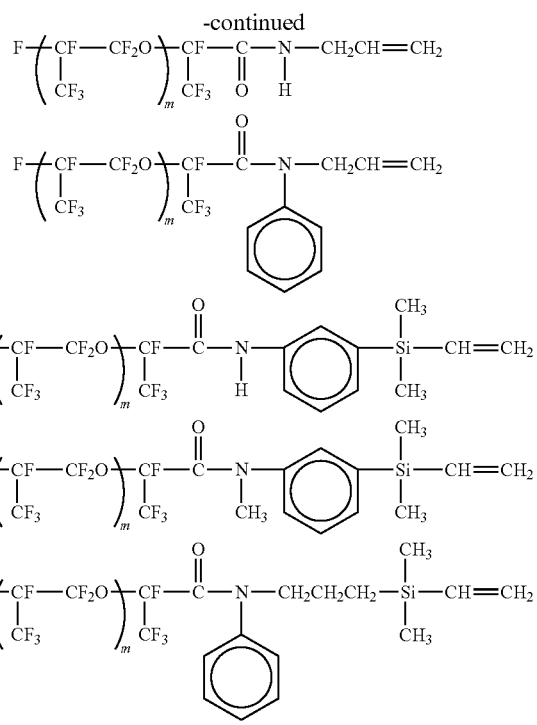

Herein m is an integer of 1 to 100.

Examples of the linear polyfluoro compounds having the general formulae (3) and (4) are given below.

Note that m is an integer of 1 to 200, n is an integer of 1 to 200, and m+n is 2 to 200.

The polyfluoro compounds having the general formulae (2) to (4) desirably have a viscosity at 23° C. of 50 to 50,000 mPa-s, more desirably 100 to 20,000 mPa-s.

When added, an amount of the polyfluoro compound having formula (2), (3) or (4) is preferably 1 to 100 parts, more preferably 5 to 50 parts by weight per 100 parts by weight of component (A).

Examples of the hydrosilylation catalyst inhibitor which can be added herein include acetylenic alcohols such as 1-ethynyl-1-hydroxycyclohexane, 3-methyl-1-butyn-3-ol, 3,5-dimethyl-1-hexyn-3-ol, 3-methyl-1-penten-3-ol, and phenylbutynol, the reaction product of a chlorosilane having a monovalent fluorinated substituent group (as described above) and an acetylenic alcohol, 3-methyl-3-penten-1-yn, 3,5-dimethyl-3-hexen-1-yn, triallyl isocyanurate, polyvinyl siloxane, and organophosphorus compounds. Cure reactivity and shelf stability are kept moderate by adding such an inhibitor.

Examples of the inorganic filler include fumed silica and precipitated silica, which may have been treated with silanes, silazanes or siloxanes, having a specific surface area of at least 50 m$^2$/g, specifically 50 to 400 m$^2$/g, more specifically 100 to 300 m$^2$/g as measured by the BET method. Also included are reinforcing or semi-reinforcing fillers such as quartz flour, fused quartz flour, diatomaceous earth and calcium carbonate; inorganic pigments such as titanium oxide, iron oxide, carbon black, and cobalt aluminate; heat resistance improvers such as titanium oxide, iron oxide, carbon black, cerium oxide, cerium hydroxide, zinc carbonate, magnesium carbonate, and manganese carbonate; heat-conductive fillers such as alumina, boron nitride, silicon carbide and powdered metals; and electric conductive agents such as carbon black, silver powder and electroconductive zinc white. The inorganic filler is preferably added in an amount of about 0.5 to 20 parts, more preferably about 1 to 20 parts by weight per 100 parts by weight of component (A).

Also useful are adhesion promoters such as carboxylic anhydrides, titanic acid esters, and zirconic acid esters, tackifiers other than component (D), and silane coupling agents such as tris(3-trimethoxysilylpropyl)isocyanurate, tris(3-triethoxysilylpropyl)isocyanurate, 3-trimethoxysilylpropylsuccinic acid, 3-triethoxysilylpropylsuccinic acid, N-phenyl-γ-aminopropyltrimethoxysilane, γ-methacryloxypropyltrimethoxysilane, γ-acryloxypropyltrimethoxysilane, β-(3,4-epoxycyclohexyl)ethyltrimethoxysilane, N-β-(aminoethyl)-γ-aminopropyltrimethoxysilane, N-β-(aminoethyl)-γ-aminopropylmethyldimethoxysilane, γ-aminopropyltrimethoxysilane, γ-aminopropyltriethoxysilane, vinyltrimethoxysilane, vinyltriethoxysilane, γ-glycidoxypropylmethyldiethoxysilane, and γ-glycidoxypropyltrimethoxysilane.

Adhesive Composition

The adhesive composition may be prepared by mixing components (A) to (D) and optional components on a mixing device such as planetary mixer, Ross mixer or Hobart mixer or a kneading device such as kneader or three-roll mill until uniform.

With respect to the formulation of the adhesive composition, the composition may be formulated as one part wherein all components (A) to (D) are combined and handled as a single compound. Alternatively, the composition may be formulated as two parts which are mixed on use. In this embodiment, one part is a mixture of components (A) and (C) and the other part is a mixture of components (B) and (D).

Although the adhesive composition thus prepared may cure at room temperature depending on the type of functional group on fluorinated amide compound (A) and the type of catalyst (C), it is recommended to heat the composition to promote curing. Preferably the composition is heat cured at a temperature of at least 60° C., more preferably 100 to 200° C. for several minutes to several hours in order to develop tenacious adhesion to various substrates.

In applying the adhesive composition, it may be diluted with a suitable fluorinated solvent in a desired concentration depending on a particular application and intended use. Suitable fluorinated solvents include 1,3-bis(trifluoromethyl)benzene, p-xylene hexafluoride, Fluorinert® (3M), perfluorobutyl methyl ether, perfluorobutyl ethyl ether, and mixtures thereof.

On brief heating, the adhesive composition establishes a tenacious bond to a wide variety of substrates including metals and plastics. Exemplary metals include aluminum, stainless steel, nickel, chromium, copper, zinc, and alloys comprising two or more of the foregoing. Exemplary plastics include epoxy resins, phenolic resins, polyester resins such as polyethylene terephthalate (PET) and polybutylene terephthalate (PBT), polycarbonate (PC) resins, polyphenylene sulfide (PPS) resins, polyimide (PA) resins, polyimide (PI) resins, and liquid crystal polymer (LCP) resins.

The compositions of the invention are useful as the adhesive for automotive parts, electric/electronic parts and the like. More illustratively, they are useful as the bonding adhesive (die attaching or die bonding agent) for semiconductor chips as detectors and sensors used in automobile control systems, such as pressure sensors, VVT sensors, gas concentration detectors, and temperature sensors; the case sealing agent and electronic circuit protective coating agent; the protective sealing agent for sensors and instruments exposed to gases, hot water and chemicals; the adhesive for ink jet printers; the adhesive and sealant for printer heads; the coating agent to rolls and belts in laser printers and copiers; and the adhesive sealing and potting agents for various circuit boards.

EXAMPLE

Examples of the invention are given below by way of illustration and not by way of limitation. Parts are by weight. Viscosity and bond strength are measurements at 23° C.

Example 1

A planetary mixer was charged with 100 parts of a polymer having formula (5) below (viscosity 12,000 mPa-s, vinyl content 0.0128 mole/100 g) and 10 parts of dimethyldichlorosilane-surface-treated fumed silica (BET surface area 250 m²/g), which were kneaded for one hour without heating. While kneading was continued, the mixer was heated until the internal temperature reached 150° C. The contents were heat treated for 2 hours under vacuum (60 Torr) while holding a temperature of 150-170° C. The contents were cooled below 40° C. and worked 2 passes on a three-roll mill, obtaining a base compound. A planetary mixer was charged with 16.5 parts of the base compound and 85.0 parts of the polymer having formula (5), which were mixed until uniform. To the mixture, 0.20 part of a toluene solution of platinum-divinyltetramethyldisiloxane complex (Pt concentration 0.5 wt %), 2.0 parts of a fluorinated organosilicon compound having formula (6) below, 1.3 parts of a fluorinated organosilicon compound having formula (7) below, and 1.0 part of a tackifier having formula (8) below were successively added. These components were mixed until uniform. This was followed by deaeration, yielding a composition.

(5)

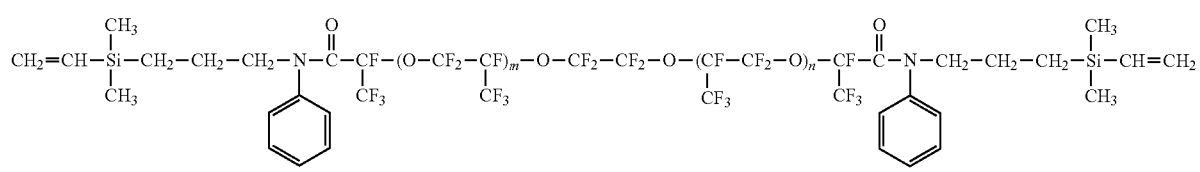

$\overline{m+n} = 90$ (6)

$$(CH_2)_3NHCO-Rf$$
$$\begin{array}{c} | \\ H \\ | \\ -SiO-(SiO)_3- \\ | \quad | \\ CH_3 \quad CH_3 \end{array}$$

Rf: $F-(CFCF_2O)_2CF-$
$\quad\quad\quad |\quad\quad\quad |$
$\quad\quad\quad CF_3\quad\quad CF_3$ (7)

$$C_8F_{17}(CH_2)_2 - \underset{\underset{CH_3}{|}}{\overset{\overset{CH_3}{|}}{Si}}O-(SiO)_{15}-\underset{\underset{CH_3}{|}}{\overset{\overset{CH_3}{|}}{Si}}-(CH_2)_2C_8F_{17}$$

(8)

Structure showing a cyclic siloxane with H, CH₃, (CH₂)₃OCH₂CH—CH₂ (epoxy), and (CH₂)₂Si(OCH₃)₃ substituents.

Adhesion Test

A dispenser cartridge was filled with the composition. A 80 µm thick layer of the composition was sandwiched between two 50×25 mm test panels of an adherend material (aluminum, stainless steel, nickel, epoxy resin, PET resin or PBT resin listed in Table 1), the panels being arranged so as to mutually overlap by 10 mm at the ends. The composition was then cured by heating at 150° C. for 1 hour, thereby giving an adhesion test specimen. The specimen was subjected to a tensile shear bond test at a pulling speed of 50 mm/min, and the shear bond strength (MPa) and cohesive failure (area %) were determined. The results are shown in Table 1.

Acid Test

The composition was placed in a rectangular mold of 105 mm by 85 mm by 2 mm (thick), press cured at 150° C. and 100 kg/cm² for 10 minutes, and oven cured at 150° C. for 50 minutes, forming a cured sheet. The sheet was cut into twelve test strips of 25 mm×50 mm for hardness measurement before and after acid immersion. As the blank, three strips were stacked and measured for hardness using a type A Durometer according to JIS K6253. The remaining strips were divided into three sets each consisting of three strips kept separated apart, which were immersed in three types of acidic liquids at 40° C. for 7 days, respectively. After the immersion, the strips were washed on their surface with alkaline water and then deionized water and wiped up residual water. The three strips of each set were stacked and measured for hardness according to JIS K6253. Also the surface state of the strips was visually observed. The results are shown in Table 2.

Example 2

A composition was prepared as in Example 1 except that 0.5 part of a tackifier having formula (9) below and 0.2 part of γ-glycidoxypropyltrimethoxysilane were used instead of 1.0 part of the tackifier having formula (8). It was similarly tested, with the results being shown in Tables 1 and 2.

(9)

Structure showing a cyclic siloxane with H, CH₃, (CH₂)₃C₄F₉, (CH₂)₃OCH₂CH—CH₂ (epoxy), and (CH₂)₂Si(OCH₃)₃ substituents.

Example 3

A composition was prepared as in Example 1 except that 2.0 parts of an organosilicon compound having formula (10) below was used instead of the organosilicon compound having formula (7). It was similarly tested, with the results being shown in Tables 1 and 2.

(10)

$$\underset{\underset{CH_3}{|}}{\overset{\overset{CH_3}{|}}{(HSiCH_2CH_2)_3SiCH_2CH_2Si(CH_2CH_2SiH)_2(CH_2CH_2SiCH_2CH_2CH_2\text{-}C_8F_{17})}}$$
(with CH₃ groups on each Si)

Comparative Examples 1 to 3

Compositions were prepared as in Examples 1 to 3, respectively, except that a polymer having formula (11) below (viscosity 12,500 mPa-s, vinyl content 0.0124 mole/100 g) was used instead of the polymer having formula (5). They were similarly tested, with the results being shown in Tables 1 and 2.

(11)

$$CH_2=CH-\underset{\underset{CH_3}{|}}{\overset{\overset{CH_3}{|}}{Si}}-\text{Ph}-\underset{\underset{|}{|}}{\overset{\overset{CH_3}{|}}{N}}-\underset{\underset{|}{\|}}{\overset{}{C}}-CF(OCF_2CF)_mOCF_2CF_2O(CFCF_2O)_nCF-\underset{\underset{|}{\|}}{\overset{}{C}}-\underset{\underset{|}{|}}{\overset{\overset{CH_3}{|}}{N}}-\text{Ph}-\underset{\underset{CH_3}{|}}{\overset{\overset{CH_3}{|}}{Si}}CH=CH_2$$
with CF₃ side groups; O double-bonded on carbonyls.

$\overline{m+n}=90$

TABLE 1

| Shear bond strength | Example | | | Comparative Examle | | |
|---|---|---|---|---|---|---|
| (MPa) | 1 | 2 | 3 | 1 | 2 | 3 |
| Adherend Aluminum | 3.2(100) | 2.9(100) | 2.7(100) | 3.0(100) | 2.7(100) | 2.8(100) |
| Stainless steel | 2.1(100) | 2.0(100) | 2.0(100) | 2.0(100) | 1.9(100) | 1.9(100) |
| Nickel | 3.0(100) | 2.8(100) | 2.9(100) | 2.8(100) | 2.7(100) | 2.8(100) |
| Epoxy resin | 1.8(100) | 1.6(100) | 1.7(100) | 1.7(100) | 1.6(100) | 1.7(100) |
| PET resin | 1.9(100) | 1.8(100) | 1.8(100) | 1.9(100) | 1.7(100) | 1.8(100) |
| PBT resin | 2.1(100) | 2.0(100) | 2.0(100) | 2.1(100) | 1.9(100) | 2.0(100) |

Cohesive failure (area %) is given in parentheses.

TABLE 2

| | Example 1 | | Example 2 | | Example 3 | |
|---|---|---|---|---|---|---|
| Acid | Hardness change | Appearance | Hardness change | Appearance | Hardness change | Appearance |
| Hydrochloric acid (36 wt %) | +1 | intact | +1 | intact | 0 | intact |
| Nitric acid (60 wt %) | +2 | intact | 0 | intact | +1 | intact |
| Sulfuric acid (98 wt %) | 0 | intact | 0 | intact | 0 | intact |

| | Comparative Example 1 | | Comparative Example 2 | | Comparative Example 3 | |
|---|---|---|---|---|---|---|
| Acid | Hardness change | Appearance | Hardness change | Appearance | Hardness change | Appearance |
| Hydrochloric acid (36 wt %) | +9 | discolored | +9 | discolored | +8 | discolored |
| Nitric acid (60 wt %) | +11 | discolored | +10 | discolored | +9 | discolored |
| Sulfuric acid (98 wt %) | −8 | discolored/degraded | −8 | discolored/degraded | −7 | discolored/degraded |

Japanese Patent Application No. 2010-093104 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An adhesive composition comprising
   (A) 100 parts by weight of a fluorinated amide compound having the general formula (1):

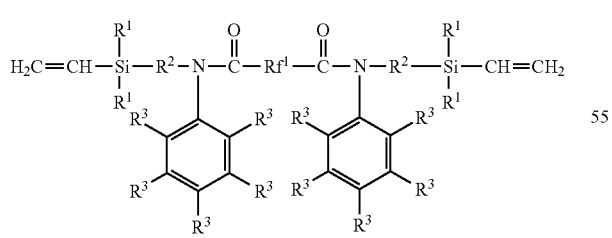

(1)

wherein $R^1$ is each independently vinyl or $C_1$-$C_4$ alkyl, $R^2$ is each independently $C_1$-$C_6$ alkylene, $R^3$ is each independently hydrogen or optionally fluorinated $C_1$-$C_4$ alkyl, and $Rf^1$ is a perfluoroalkylene or divalent perfluoropolyether group, (B) a fluorinated organosilicon compound containing in a molecule at least one monovalent perfluoroalkyl, monovalent perfluorooxyalkyl, divalent perfluoroalkylene or divalent perfluorooxyalkylene group and at least two silicon-bonded hydrogen atoms, and further containing a silicon-bonded monovalent substituent group which is selected from unsubstituted or halo-substituted $C_1$-$C_{20}$ alkyl, aryl and aralkyl groups, in an amount to give 0.5 to 3.0 moles of SiH groups per mole of vinyl in component (A),
   (C) a catalytic amount of a platinum group compound, and
   (D) 0.1 to 10 parts by weight of an organosiloxane containing in a molecule at least one silicon-bonded hydrogen atom and at least one epoxy and/or trialkoxysilyl group bonded to a silicon atom via carbon atoms or carbon and oxygen atoms.

2. The adhesive composition of claim 1 wherein the organosiloxane (D) further contains at least one monovalent perfluoroalkyl or monovalent perfluorooxyalkyl group bonded to a silicon atom via carbon atoms or carbon and oxygen atoms.

* * * * *